Figure 1:
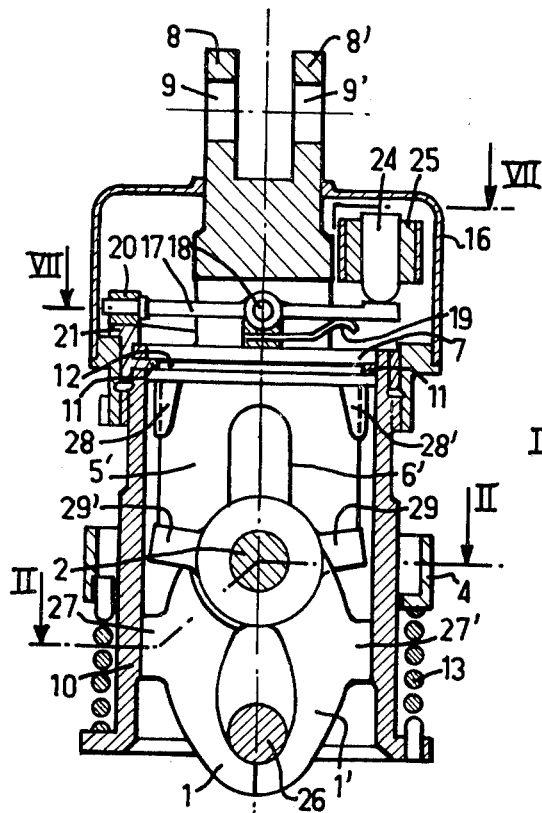

United States Patent [19]

Delest

[11] 4,017,112
[45] Apr. 12, 1977

[54] DEVICE FOR RELEASING A LOAD FROM ITS SUPPORT

[75] Inventor: René Delest, Meudon, France
[73] Assignee: Callisto, France
[22] Filed: Apr. 15, 1976
[21] Appl. No.: 677,329
[30] Foreign Application Priority Data

Apr. 21, 1975 France .................... 75.12364

[52] U.S. Cl. .................... 294/83 R; 294/110 R
[51] Int. Cl.² .................... B66C 1/38
[58] Field of Search ............ 294/75, 83 R, 83 A, 294/83 AB, 106, 110 R, 115, 116

[56] References Cited

UNITED STATES PATENTS

| | | | |
|---|---|---|---|
| 1,150,500 | 8/1915 | Chab | 294/115 X |
| 2,476,734 | 7/1949 | Jellison | 294/83 R |
| 2,879,099 | 3/1959 | Riedesser | 294/83 R |
| 3,081,122 | 3/1963 | Jungersen | 294/83 R |

*Primary Examiner*—Johnny D. Cherry

[57] ABSTRACT

Device for releasing a load from its support comprising two clamping jaws for the load, mounted inside a sleeve formed with openings and movable in relation to said sleeve under the combined action of the load and of a spring whose action is applied in the opposite direction to the load, between two positions, a lower position where the jaws are compulsorily closed and a higher position where the jaws can open due to the shape of the jaws and the position of the openings with means inhibiting the relative movement of said jaws in relation to said sleeve and driving means arranged so that it stops the action of said inhibiting means.

10 Claims, 9 Drawing Figures

DEVICE FOR RELEASING A LOAD FROM ITS SUPPORT

The present invention relates to a device for releasing a load from its support, for instance a load dropped by parachute from an aircraft, or a load hanging on a crane or helicopter cable.

Generally speaking, the release of the load is provided directly by hand by removing a lock and cannot be operated from a distance, which, in some cases, is necessary, especially in the hereinabove mentioned cases.

Some devices provide on the other hand, automatic release of the load when its weight does not have any more action on its support. This is particularly the case of loads dropped by parachute from aircrafts. But then appears a difficulty due to the fact that when the parachute is being unfolded, the descent of the load is abruptly braked and the resiliency of the suspending ropes causes a rebound annulling the weight of the load and even bouncing it, thus untimely operating the release device.

An object of the invention is to provide a device avoiding such untimely operation and likely to be used in the various applications where is required either an automatic delayed control, or a distance operated control or a release operation ensured when the load is being lightened, for instance when contacting the ground or any other objective.

The invention applies in particular to devices designed for instance for releasing loads dropped by parachute, as it allows to foresee the release of the immobilized means after a certain time of fall and the locking of the clamping means, only when the load is being lightened, for instance when contacting the ground or water.

Other objects and advantages of the invention will become apparent from the following description of two embodiments of the invention and the new features of the invention will become clear from the claims.

Figure 3:
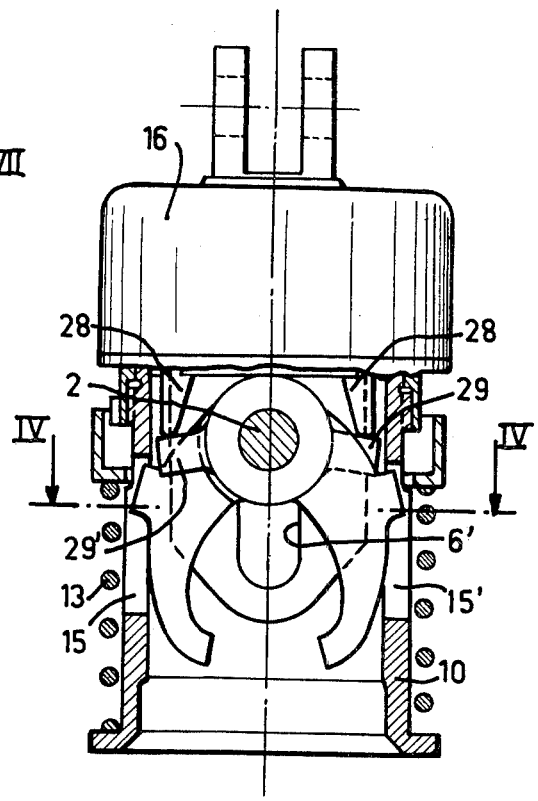
Figure 2:
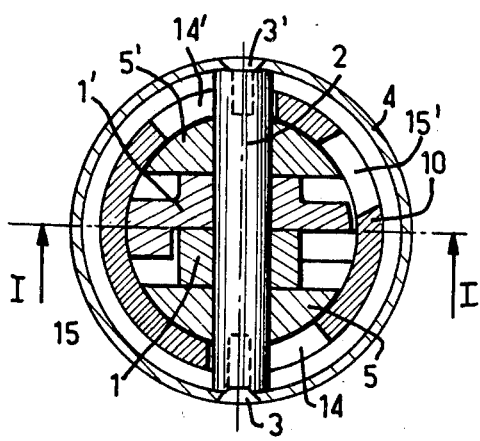
Figure 4:
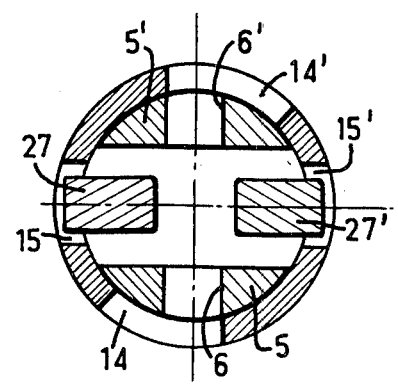
Figure 5:
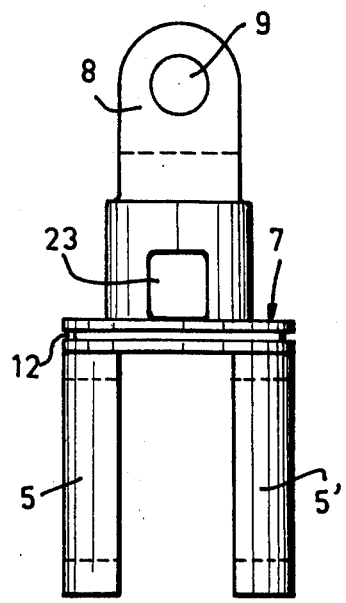
Figure 6:
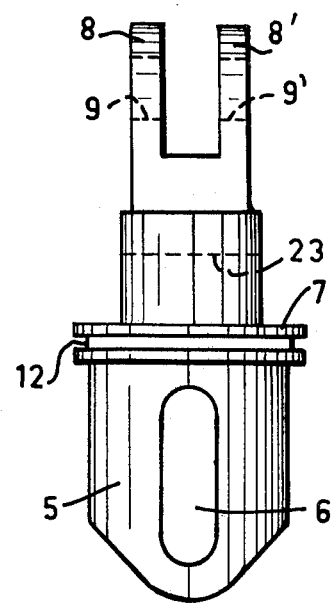
Figure 7:
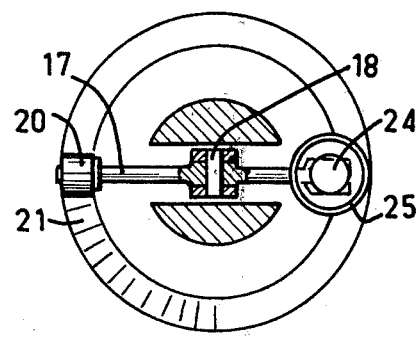
Figure 8:
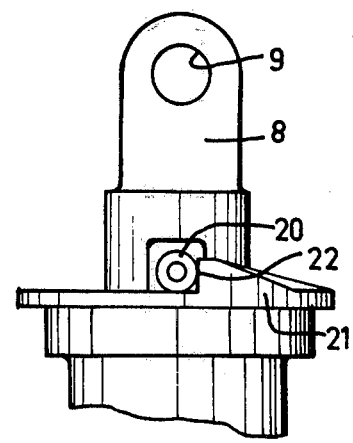
Figure 9:
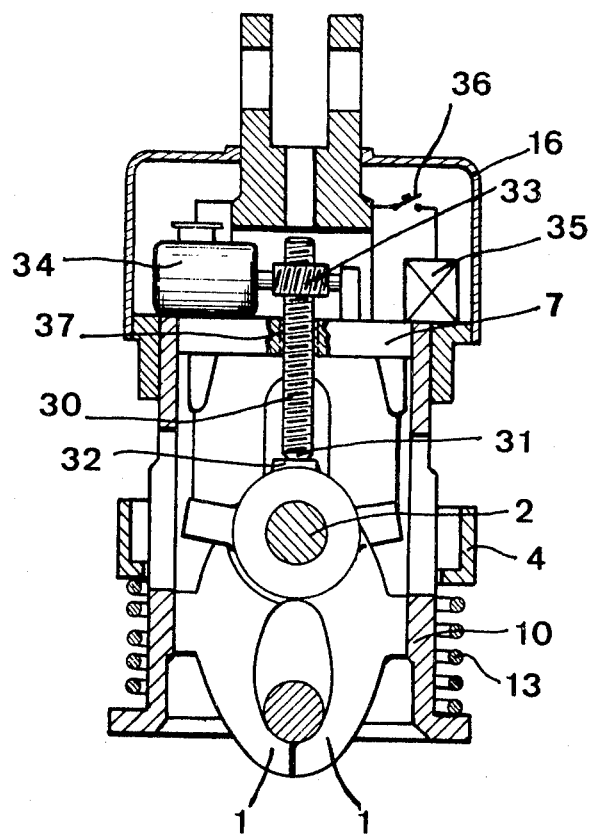

In the accompanying drawing:

FIG. 1 is a diametrical vertical sectional view through the device wherein the load is in its hanging position, on line I—I of FIG. 2, FIG. 2 is a sectional vew on line II—II of FIG. 1, FIG. 3 is a sectional view similar to FIG. 1, but wherein the load is in its released position, FIG. 4 is a sectional view on line IV—IV of FIG. 3, FIGS. 5 and 6 are elevational views, at an angle of 90° in relation to each other, of the load of the central member of the device, FIG. 7 is a sectional view on line VII—VII of FIG. 1, FIG. 8 is an elevational view of the upper portion of the device, and FIG. 9 is a vertical sectional view, similar to FIG. 1, through a further embodiment.

In the example illustrated in FIGS. 1 to 8, the device comprises two jaws 1, 1' mounted pivotally about a common axle 2 affixed by both its ends 3, 3' on two diametrically opposite points of a circular ring 4. The axle 2 is slidably mounted in a fork-joint, the two arms 5, 5' of which are formed with a "buttonhole" slot 6, 6'. This fork-joint has two arms 8, 8' which are formed with bores 9, 9' intended for receiving a support-axle of the device assembly.

The jaws 1, 1' and fork-joints 5, 5' assembly is surrounded by a cylindrical sleeve 10 coaxial with ring 4 and axially maintained on plate 7. Sleeve 10 can rotate on itself about the axis of the device due to protruding portions 11 engaged in a peripheral groove 12 of plate 7 and to the action of a spring 13 whose ends are attached respectively to this sleeve 10 and to ring 4 and operating as torsion as well as a flexure spring. Sleeve 10 is formed with two pairs of opening diametrically opposite, on the one hand two openings 14, 14' allowing clearance of axis 2 when sleeve 10 rotates about its axis, and on the other hand two openings 15, 15' allowing unlocking of jaws 1, 1'.

On plate 7, inside a protective casing 16, is mounted a lever 17 pivoted about an axle 18 and returned upwards by a spring 19. One of the lever ends of lever 17 has a roller 20 co-operating with a ramp 21 and an abutment shoulder 22 attached to the upper portion of sleeve 10. Lever 17 extends through a bore 23 of fork-joint 8, 8' and its other end is in proximate relationship with the end of the plunger-piston 24 of an electro-magnet 25.

The device operates as an immediate result of the foregoing.

Initially, the load, carried by ring 26, is hung and maintained by jaws 1, 1' kept clamped by the fact that their projections 27, 27' are in abutment against the inner wall of sleeve 10 which is locked by roller 20 blocked against shoulder 22 of cam 21.

When electro-magnet 25 is energized, for instance by distance control or automatically, with or without time-delay, plunger 24 pivots lever 17 as against the action of its own spring 19 and frees roller 20 from its abutment 22. Spring 13 acts then as a torsion spring and rotates sleeve 10 to bring it in the position of FIGS. 3 and 4. Projections 27, 27' of jaws 1, 1' are always in abutment against the inner wall of sleeve 10, but when the load weight becomes lower than the tension of spring 13 when contacting the ground for instance, spring 13 is released, ring 4 and with it jaw axle 2 slide upwards, axle 2 being guided in the "buttonholes" 6, 6'. Projections 27, 27' of the jaws are then positioned opposite openings 15, 15' and the action of studs 28, 28' on catches 29, 29' of the jaws causes pivoting of jaws 1, 1' and release of the load.

Inside hood 16 is arranged a standard electronic unit (not shown) whose energy is supplied by a separate electricity source, for instance a battery, which energizes automatically electro-magnet 25 after a predetermined period.

It is apparent that other controlling means for the electro-magnet can be conceived, for instance in the case of a helicopter or a crane, a remote control by electrical cable or by electronic means sensitive to audio-visual means, with or without time-delay.

Instead of being operated by electro-magnet 25, lever 17 can be operated by mechanical or pyrotechnical means. It could also be operated by an electric motor driving a cam with which the roller attached to the end of the lever would co-operate. The time-delay device in such a case could be provided by the opportune choice of the motor rotation speed and the cam shape.

In example of FIG. 9, the same numeral references are applied to identical parts as those of FIG. 1. In this example, sleeve 10 is stationary and spring 13 works only as a flexure spring.

An endless screw 30, positioned in the axis of the device, is supported by its end 31 on the upper portion 32 of jaws 1 or 1'. This screw 30 extends through plate 7 in a tapped bore 37 operating as a nut and extends through hood 16. It is in gear with a drive pinion 33 connected to an electric motor 34. This motor 34 is energized by a separate source 35, for instance a battery, to which it is connected via a switch 36 operable from the outside of hood 16.

When switch 36 is operated, either directly by hand, of from a distance by a cable or any other means, motor 34 starts and drives pinion 33 which in turn drives screw 30 upwards.

The characteristics of motor 34, pinion 33 and screw 30 can be chosen so that jaws 1, 1' reach the higher portion where they can open only after a pre-determined period of time after closing switch 36, thus providing a control with time-delay.

What I claim is:

1. Device for releasing a load from its support comprising two clamping jaws for the load, mounted inside a sleeve formed with openings and movable in relation to said sleeve under the combined action of the load and of a spring whose action is applied in the opposite direction to the load, between two positions, a lower position where the jaws are compulsorily closed and a higher position where the jaws can open due to the shape of the jaws and the position of the openings with means inhibiting the relative movement of said jaws in relation to said sleeve and driving means arranged so that it stops the action of said inhibiting means.

2. Device according to claim 1, wherein the jaws are supported by a common axle attached to a ring co-axial to and outside the sleeve, and the spring is arranged in order to act on said ring.

3. Device according to claim 1, wherein said inhibiting means is arranged to act on the sleeve.

4. Device according to claim 3, wherein the sleeve is cylindrical and mounted rotatory about its axis.

5. Device according to claim 4, wherein the relative movement of the sleeve and the jaws is caused by a unique spring working as flexure and as torsion spring.

6. Device according to claim 4, wherein the sleeve comprises an abutment and the inhibiting means is constituted by a pivoted lever, one end of which co-operates with such abutment.

7. Device according to claim 1, wherein the inhibiting means is arranged to act on the jaws.

8. Device according to claim 7, wherein the inhibiting means is a screw engaging one end with the upper portion of the jaws.

9. Device according to claim 1, wherein the opening of the jaws is caused by action of fixed studs on catches attached to said jaws when such jaws are being unlocked.

10. Device according to claim 1, wherein said driving means is arranged so as to cause a stop of the action of the inhibiting means with time-delay.

* * * * *